US012612189B2

(12) United States Patent
Nemanick et al.

(10) Patent No.: US 12,612,189 B2
(45) Date of Patent: Apr. 28, 2026

(54) INDEPENDENTLY MOVING SPACE VEHICLES CONFIGURED TO DEPLOY AND POSITION A SPACE STRUCTURE

(71) Applicant: The Aerospace Corporation, El Segundo, CA (US)

(72) Inventors: Eric Joseph Nemanick, Santa Monica, CA (US); Henry Helvajian, Pasadena, CA (US); Andrea G. Hsu, El Segundo, CA (US); John H. Schilling, Lancaster, CA (US); Thomas A. Battista, Ashburn, VA (US); Mark J. Barrera, Hermosa Beach, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 0 days.

(21) Appl. No.: 18/475,113

(22) Filed: Sep. 26, 2023

(65) Prior Publication Data

US 2025/0100718 A1     Mar. 27, 2025

(51) Int. Cl.
*B64G 1/64*          (2006.01)
*B64G 1/10*          (2006.01)
          (Continued)

(52) U.S. Cl.
CPC ........... *B64G 1/6462* (2023.08); *B64G 1/245* (2023.08); *B64G 4/00* (2013.01); *B64G 1/1078* (2013.01);
          (Continued)

(58) Field of Classification Search
CPC .... B64G 4/00; B64G 1/222; B64G 2004/005; B64G 1/1078; B64G 1/245; B64G 1/6462; B64G 1/1085
See application file for complete search history.

(56) References Cited

U.S. PATENT DOCUMENTS 5,299,764 A * 4/1994 Scott ...................... G06N 3/008
                                                244/172.5
6,689,952 B2    2/2004 Kawaguchi
          (Continued)

FOREIGN PATENT DOCUMENTS

FR          3056305 A1 * 3/2018 ............. B64C 39/00

OTHER PUBLICATIONS

Dissly, Flash Lidars for Planetary Missions, 2012, International Workshop on Instrumentation for Planetary Missions, p. 1-5 (Year: 2012).*

(Continued)

*Primary Examiner* — Magdalena Topolski
*Assistant Examiner* — Shanna Danielle Glover
(74) *Attorney, Agent, or Firm* — LeonardPatel PC

(57)          ABSTRACT

Independently moving deployment and positioning space vehicles that are configured to deploy and/or position structures are disclosed. The deployment and positioning vehicles work together to deploy and/or maintain the position/shape of a space structure. The deployment and positioning vehicles may include one or more thrusters, an attitude determination and control system (ADCS), a precision vehicle-to-vehicle location determination system, processing circuitry, etc. Two or more deployment and positioning vehicles are configured to coordinate the deployment and/or positioning of the space structure themselves or in concert with the other deployment and positioning vehicles in the deployment and positioning vehicle network, as well as achieve precision positioning.

26 Claims, 13 Drawing Sheets

(51) Int. Cl.
B64G 1/22 (2006.01)
B64G 1/24 (2006.01)
B64G 4/00 (2006.01)

(52) U.S. Cl.
CPC ........ *B64G 1/222* (2013.01); *B64G 2004/005* (2013.01)

(56) References Cited

U.S. PATENT DOCUMENTS

| | | | |
|---|---|---|---|
| 7,913,953 B2 | 3/2011 | Ellinghaus | |
| 10,309,798 B2 * | 6/2019 | Maeda | G01S 5/163 |
| 10,696,425 B2 | 6/2020 | Hickman | |
| 11,155,366 B2 | 10/2021 | Helvajian | |
| 11,492,143 B2 * | 11/2022 | Clark | B64G 1/6462 |
| 11,518,552 B2 | 12/2022 | Ulrich et al. | |
| 12,202,627 B2 * | 1/2025 | Belieres Montero | B64G 1/6462 |
| 2006/0145024 A1 * | 7/2006 | Kosmas | B64G 1/1078 244/172.5 |
| 2008/0217482 A1 | 9/2008 | Ellinghaus | |
| 2018/0257795 A1 | 9/2018 | Ellinghaus | |
| 2019/0023419 A1 | 1/2019 | Helvajian | |
| 2019/0023424 A1 | 1/2019 | Helvajian et al. | |
| 2019/0226197 A1 | 7/2019 | Bright | |
| 2020/0283172 A1 | 9/2020 | Williams et al. | |
| 2022/0041302 A1 | 2/2022 | Sippel | |
| 2022/0227504 A1 * | 7/2022 | Lindsay | B64G 1/645 |
| 2024/0051683 A1 * | 2/2024 | Mukae | B64G 1/1085 |

OTHER PUBLICATIONS

Atomic Planar Power for Lightweight Exploration (APPLE) technology article available at https://aerospace.org/press-release/prototype-spacecraft-power-system-deep-space-secures-600k-nasa-grant (Mar. 31, 2022).
"LightSail, A Planetary Society Solar Sail Spacecraft", retrieved from the internet Oct. 13, 2022, https://www.planetary.org/sci-tech/lightsail.
"NASA-Supported Solar Sail Could Take Science to New Heights", retrieved from the internet Oct. 13, 2022, https://www.nasa.gov/press-release/nasa-supported-solar-sail-could-take-science-to-new-heights.

* cited by examiner

200

220

224

222

232

210        212        214        216        230

500

510

540

530      520

700

START

Deploy the Deployment and Positioning Vehicle — 710

Ascertain Vehicle Location — 720

Ascertain Target Destination Location — 730

Calculate Thrust and Orientation for Vehicle — 740

Orient Vehicle — 750

Execute Thruster Operation(s) — 760

Reassess Movement Operation — 770

At Destination? — 780

NO

YES

Begin Mission Operations — 790

END

900

INDEPENDENTLY MOVING SPACE VEHICLES CONFIGURED TO DEPLOY AND POSITION A SPACE STRUCTURE

FIELD

The present invention generally pertains to deployment of structures in space, and more particularly, to independently moving space vehicles that are configured to deploy and/or position structures.

BACKGROUND

Current solar sail deployment technologies deploy solar sails using spring loaded struts, motor driven struts, or centripetal forces to pull or push the solar sail open and keep the solar sail taut. However, these techniques are limited in the size of sails they can deploy, as well as the attendant complexity and failure risk from single point failure deployment systems. The mass and complexity of these solar sail deployment systems scales with the size of the sail to be deployed, meaning that there is an upper limit to the sail size that can be deployed by existing techniques, where the deployment system is too large/massive/complex to reliably implement.

Other structures, such as solar arrays and antennas, also do not scale well to large sizes when deploying. The current deployment mechanisms for these structures are inadequate for various missions, such as for cis-lunar space and beyond, where deployment mechanisms should reliably unfold, roll out, or otherwise deploy ever larger structures without significant mass or volume required. Currently, deploying structures in space requires complicated and fault intolerant moving components within the structures themselves, such as mechanical motors for rolling out solar arrays, motor-driven hinges, or complex spins for centripetal deployments. These internal components add mass and volume for fairing packing, and thereby, limit the size of the structures that can be launched.

The riskiest time in the deployment of a space structure is the initial activation and unfolding of arrays, antennas, sails, or other deployables. These structures currently require complex, moving, powered parts to unfailingly activate for a mission to even start. Failure of these components has already cost billions of dollars in failed or reduced capabilities for satellite missions. Accordingly, improved and/or alternative space structure deployment technologies may be beneficial.

SUMMARY

Certain embodiments of the present invention may be implemented and provide solutions to the problems and needs in the art that have not yet been fully solved by existing space structure deployment technologies, and/or provide a useful alternative thereto. For example, some embodiments pertain to independently moving space vehicles that are configured to deploy and/or position structures.

In an embodiment, a space structure deployment and/or positioning system includes a deployment and positioning vehicle. The deployment and positioning vehicle includes one or more thrusters configured to propel the deployment and positioning vehicle and an attitude determination and control system (ADCS) configured to rotate and orient the deployment and positioning vehicle. The deployment and positioning vehicle also includes a grasping or attachment mechanism configured to operably connect the deployment and positioning vehicle to a space structure. The deployment and positioning vehicle further includes a precision vehicle-to-vehicle location determination system configured to determine relative locations of other deployment and positioning vehicles in a deployment and positioning vehicle network (e.g., with an accuracy of less than one centimeter from the actual position). Additionally, the deployment and positioning vehicle includes processing circuitry configured to control the or more thrusters, the ADCS, and the grasping or attachment mechanism. The processing circuitry is configured to control the grasping or attachment mechanism to grab onto or attach to a corresponding location of the space structure.

In another embodiment, a deployment and positioning vehicle includes one or more thrusters configured to propel the deployment and positioning vehicle and an ADCS configured to rotate and orient the deployment and positioning vehicle. The deployment and positioning vehicle also includes a grasping or attachment mechanism configured to operably connect the deployment and positioning vehicle to a space structure. The deployment and positioning vehicle further includes a precision vehicle-to-vehicle location determination system configured to determine relative locations of other deployment and positioning vehicles in a deployment and positioning vehicle network. Additionally, the deployment and positioning vehicle includes processing circuitry configured to control the or more thrusters, the ADCS, and the grasping or attachment mechanism. The processing circuitry is configured to control the grasping or attachment mechanism to grab onto or attach to a corresponding location of the space structure.

In yet another embodiment, a mothership includes a star tracker, a sun sensor, a global positioning system (GPS), an antenna, or any combination thereof. The mothership also includes one or more antennas, a laser and a telescope, or both. The mothership further includes communications circuitry configured to control the one or more antennas, the laser and the telescope, or both. The mothership is configured to determine an actual position of the mothership in space and communicate the actual position to one or more deployment and positioning vehicles in a deployment and positioning vehicle network using the communications circuitry.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1A:
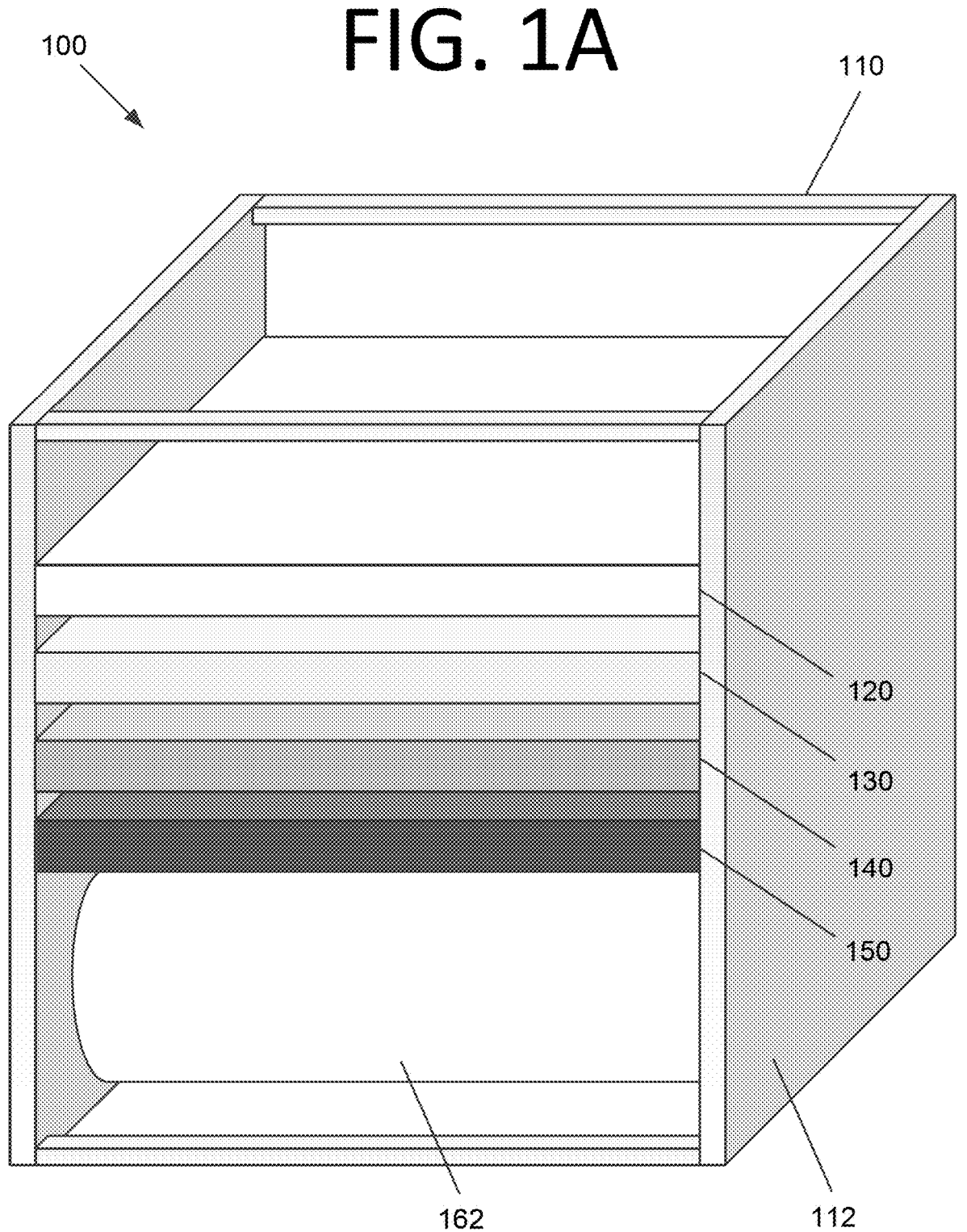
FIG. 1A illustrates a deployment and positioning vehicle exposing components within a frame, according to an embodiment of the present invention.
Figure 1B:
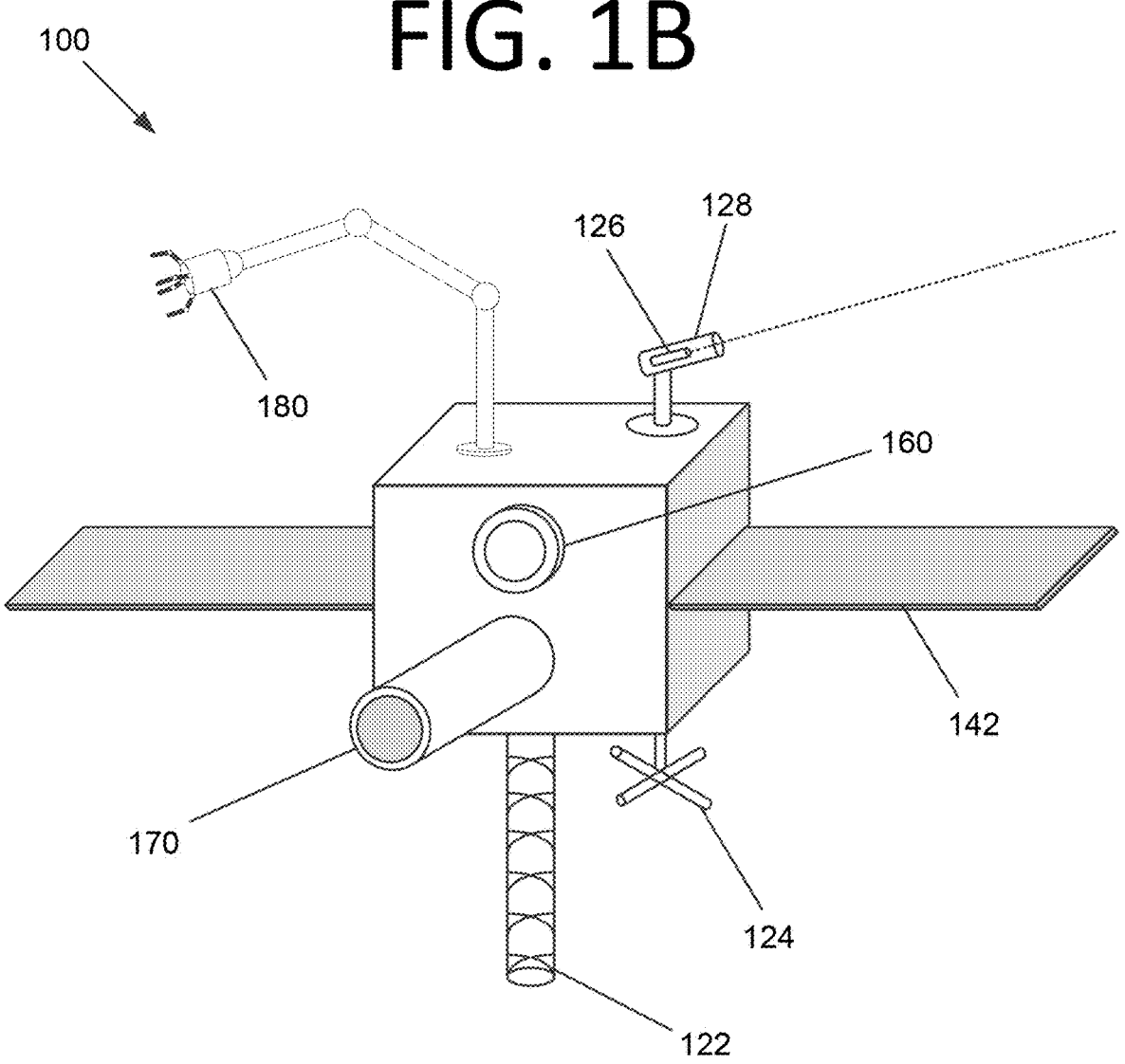
FIG. 1B is a perspective view illustrating the deployment and positioning vehicle, according to an embodiment of the present invention.
Figure 1C:
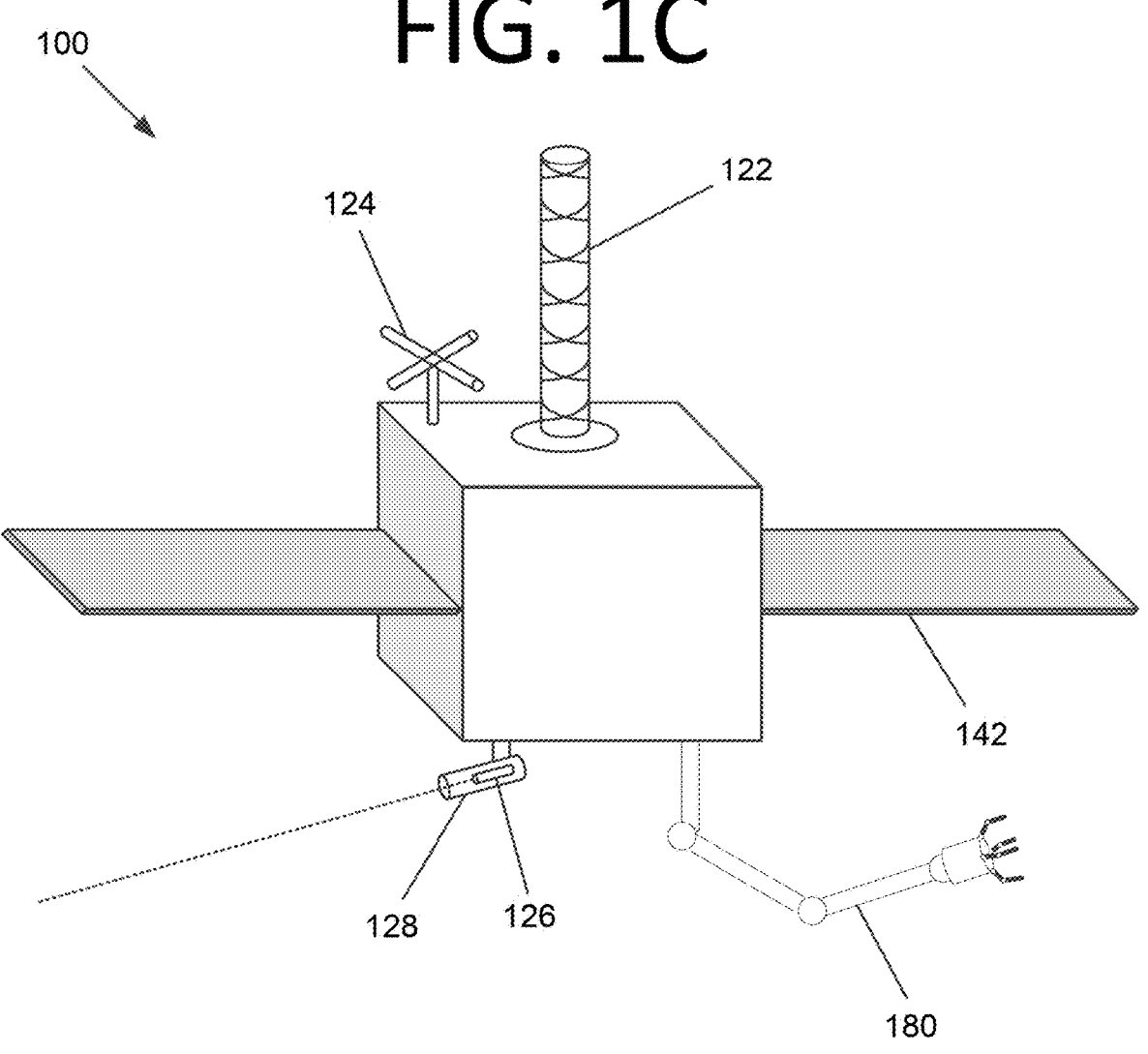
FIG. 1C is another perspective view illustrating the deployment and positioning vehicle, according to an embodiment of the present invention.
Figure 1D:
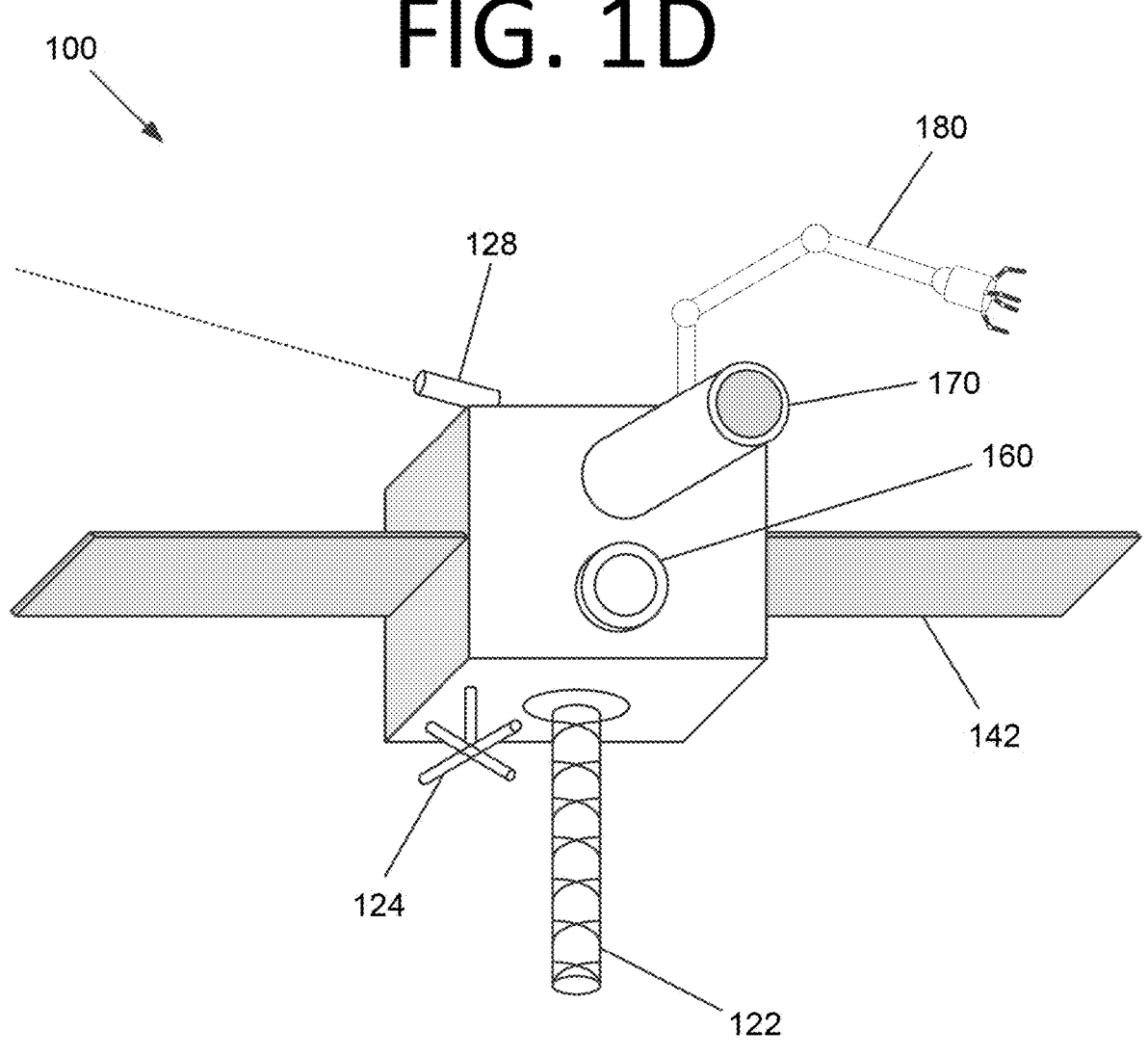
FIG. 1D is yet another perspective view illustrating the deployment and positioning vehicle, according to an embodiment of the present invention.

Some embodiments of the present invention pertain to independently moving space vehicles, called "deployment and positioning vehicles" herein, that are configured to deploy and/or position structures. Such deployment and positioning vehicles may provide a lighter weight, more flexible, and more reliable deployment and positioning system that enables the deployment of space structures that are potentially much larger than currently possible with mechanical components of the structure itself. The deployment and positioning vehicles may be housed in and deployed from a payload attached to the structure to be deployed, or from a separate space vehicle (e.g., a "mothership" vehicle). In certain embodiments, the deployment and positioning vehicles may be stationed in an orbit or other space location and travel to a structure to be deployed, such as a solar sail, space station, antenna, or any other suitable space structure without deviating from the scope of the invention.

The deployment and positioning vehicles may be used for various applications in some embodiments. For instance, deployment and positioning vehicles could be used for removal of failure prone deployment mechanisms for spacecraft, reducing mass and increasing reliability. Solar arrays, antennas, panels, instrument booms, etc. could be pulled open and locked into place. An independent swarm of deployment and positioning vehicles may be stationed in a "deployment location" that spacecraft can enter to be deployed, maneuvered, or positioned. Deployment of large space antenna structures can be accomplished through pulling and rotating by the deployment and positioning vehicles, thereby generating an outward force, which can facilitate much larger antennae than are possible with current designs.

Indeed, current designs are limited to tens of meters in length. In space manufacturing, deployment and positioning vehicles can pull components and materials into place for building larger structures than can be fit in a single launch vehicle. Large, free flying telescope occulters can be deployed and controlled via the deployment and positioning vehicles to enable direct exoplanet viewing by blocking the light of the host star. A set of deployment and positioning vehicles that can deploy their own solar sail while acting independently would open up a new regime of fast transiting and highly capable deep space investigations at a reduced cost as compared to existing flagship missions. Large solar mirrors for lunar illumination could be deployed via deployment and positioning vehicles to enable continual occupation of lunar craters where water has been found.

The deployment and positioning vehicles have propulsion capabilities (e.g., electrospray thrusters, pulsed plasma thrusters, ion thrusters, chemical thrusters (e.g., liquid and/or solid propellant rocket motors), etc.) that the deployment and positioning vehicles can utilize both to deploy, maintain, and potentially adjust the shape and/or position of a space structure (e.g., unfurling a solar sail perpendicular to the solar pressure and to keep the solar sail taut). The deployment and positioning vehicles may have their own attitude control, processing, communications, etc. Power tiles, such as those developed by the Aerospace Corporation®, and/or radioisotope thermoelectric generators (RTGs), such as the multi-mission RTG (MMRTG) designed and utilized by NASA, and/or solar cells and arrays, may be used in some embodiments.

The deployment and positioning vehicles may compensate for a gravitational gradient across large structures that occurs in any space location. Gravitational drift differences may be accounted for in order to provide post-deployment stability. Gravitational corrections would be done locally by each deployment and positioning vehicle applying force to the main structure. If relatively close to a large gravitational body, such as the Earth, another planet, or a moon, the deployment and positioning vehicles would compensate for the gravity gradient generated by the Earth or other body. The deployment and positioning vehicles may hold the shape of the structure by opposing the gravitational gradient, solar flux, or other internal and/or external forces that may cause the structure to drift, collapse, alter its shape, etc.

The structure may also be rotated to take advantage of radial acceleration to assist in keeping the structure taut once deployed. During turning/reorientation maneuvers, the rotation may be slowed or stopped, and the structure could then be spun back up when in the new position. This reduces the amount of thrust that is required as opposed to changing the position while the structure is spinning.

In the case of solar sails, for example, since the area of the sail in ratio to the payload to be moved defines the ultimate velocity of the payload, a larger sail and lower mass vehicle allows faster travel. By using deployment and positioning vehicles, large area solar sails (e.g., a 100 meter diameter or more) can be deployed to provide vehicle speeds higher than those previously attainable for space missions. Furthermore, the position of the solar sail may be adjusted to best take advantage of the solar wind. Unfurling the solar sail may essentially be "origami in reverse" where the deployment and positioning vehicles unfold the solar sail during deployment. There would be an order in which the solar sail is unfolded and pulled open, and additional vehicles may attach at different stages of the process. The biggest external force on a solar sail is typically the sun, and if the solar sail is not directly perpendicular to the sun's flux, a significant differential force would be applied across the sail. The deployment and positioning vehicles may compensate for this force and dampen billowing.

The deployment and positioning vehicles of some embodiments work in concert to deploy structures including, but not limited to, solar arrays, antennas, mirrors, star shades, solar sails, telescopes, and/or any other large, deployable space structure without out deviating from the scope of the invention. The deployment and positioning vehicles may collectively have a substantially lower mass than what would be required for mechanical deployment subsystems included as part of the structures themselves. For instance, in some embodiments, the deployment and positioning vehicles may each have a mass of 5-10 kilograms (kg) and use electric propulsion with a high specific impulse to individually maneuver themselves, as well as sensors and radio frequency (RF), laser ranging, or other photon-based distance and positioning systems (also referred to as "precision vehicle-to-vehicle location determination systems" herein) to provide precision location capabilities and to locate themselves within a network of deployment and positioning vehicles. Propellant included in these vehicles may provide thousands of hours of operation without refueling. Also, the relatively slow, gentle thrust from electric propulsion (i.e., from electrospray, pulsed plasma, or ion thrusters) is superior to mechanical deployment systems such as spring-loaded or shape memory booms, which often require additional jigging to reduce the speed and force of opening, creating stress or flexing modes. Furthermore, as many deployment and positioning vehicles as desired may be provided over multiple launches, and these vehicles may be maintained and serviced in an orbit that allows them to travel to a structure, deploy the structure, and then redeploy for another mission. This provides a flexible and reusable deployment mechanism.

In some embodiments, at least some of the functions of the deployment and positioning vehicles are offloaded to a larger mothership vehicle, which may have the power to manage space-to-ground links for command and control and ranging. In certain embodiments, the mothership vehicle provides an absolute position reference for the deployment and positioning vehicles to locate themselves relative to other vehicles with high precision (e.g., accuracy of less than one centimeter from the actual position). The deployment and positioning vehicles in some embodiments are able to push and pull structures without the need for internal motors, springs, or weighty installed deployment mechanisms. This capability, potentially in concert with a mothership vehicle, brings together compact power, long duration propulsion, precise positioning, rapid onboard computation, and communications.

FIGS. 1A-D illustrate a deployment and positioning vehicle 100, according to an embodiment of the present invention. Deployment and positioning vehicle 100 includes a frame 110 with faces covered by covers 112. Covers of four of the six faces are removed in FIG. 1A to more clearly show underlying components. While deployment and positioning vehicle 100 is a CubeSat in this embodiment, it should be noted that any suitable space vehicle shape, size, and/or type may be used without deviating from the scope of the invention.

In certain embodiments, some or all of the deployment and positioning vehicles may not be identical to one another, and may be designed for respective purposes. For instance, in an example solar sail deployment embodiment, one type of deployment and positioning vehicle may be suited for initially removing the solar sail from a launch vehicle fairing and another type may be suited for unfurling the solar sail, keeping it taut, and repositioning the orientation of the solar sail as desired for a given location and mission. In the case of solar array deployment, one or more vehicles may have a higher impulse thruster to provide the force to start the unfurling, and one or more other vehicles with lower impulse thrust may maintain the open position of the solar array, allowing the high impulse vehicle(s) to be deployed to another location. In the case of a large solar occulter, which is a shade to protect sensitive telescope components, deployment may initially be performed by high impulse, low propellant vehicles to unfold the occulter, and separate low impulse, high propellant vehicles can take over for control of the structure by performing numerous small thrusts to control the occulter shape, perform small lateral translations, and/or other maintenance and operation maneuvers that may require many small, controlled impulse operations.

Deployment and positioning vehicle 100 includes communications circuitry 120 that houses RF circuitry for helical (high gain) antenna 122 and dipole (low gain) antenna 124, optical processing circuitry for laser 126 and telescope 128, etc. (also referred to as "precision vehicle-to-vehicle location determination systems" herein). The RF circuitry and antennae allow deployment and positioning vehicle 100 to communicate with ground stations on Earth, space stations, other deployment and positioning vehicles, motherships, and/or other types of space vehicles. The optical processing circuitry, laser 126, and telescope 128 allow deployment and positioning vehicle 100 to accurately determine its position with respect to other deployment and positioning vehicles and/or other spacecraft, and potentially with respect to the structure to determine where to grab or otherwise attach to the structure with high precision. Such accurate positioning may be particularly important for certain missions. For instance, if the deployable structure is a mirror/reflector for a space telescope, deployment and positioning vehicles 100 would need to be very precise such that the shape of the mirror is extremely close to the designed shape for the telescope during the mission. This would require very precise coordination between the deployment vehicles to properly position and orient/re-orient the mirror. In certain embodiments, deployment and positioning vehicles 100 may fasten or otherwise connect portions of the mirror/reflector together upon deployment thereof.

Processing circuitry 130 is the "brains" of deployment and positioning vehicle 100. Processing circuitry 130 may include processor(s) (e.g., a central processing unit (CPU)), field programmable gate array(s) (FPGAs), accelerator(s) (e.g., graphical processing unit(s) (GPUs)), etc. Processing circuitry 130 may perform command and data handling (C&DH) operations, control thrusters and orientation of deployment and positioning vehicle 100, store and execute code for mission operations, process requests from other deployment and positioning vehicles, a mothership, ground stations, other types of space vehicles, a space station, etc. In some embodiments, deployment and positioning vehicle 100 may have similar components to those described in U.S. Patent Application Publication No. 2019/0023424 and/or U.S. Pat. No. 11,155,366).

Power system 140 is operably connected to solar arrays 142. Power system 140 includes power circuitry, and also includes, or is operably connected to, batteries that receive power from solar arrays 142 via power system 140. Power system 140 also disperses power to electronic components of deployment and positioning vehicle 100. Additionally or alternatively, power system 140 may include heat-to-electricity generation capabilities for locations where solar illumination may not be suitable for vehicle power, for instance. Power tiles and/or RTGs may be used as part of power system 140 to provide heat-to-electricity power generation in some embodiments.

An attitude determination and control system (ADCS) system 150 contains electronics and inertial components to maintain or modify the orientation of deployment and positioning vehicle 100 in space. In some embodiments, ADCS system 150 works in concert with ADCS systems of other deployment and positioning vehicles to form a collective system for attitude control. ADCS system 150 spins reaction wheels or rods up and down in order to achieve the orientation requested by processing circuitry 130. For instance, three reaction wheels may be provided that are respectively perpendicular to one another to facilitate orientation maintenance and changes in three-dimensional space.

Communications circuitry 120, processing circuitry 130, power system 140, and ADCS system 150, as well as other electronic components of deployment and positioning vehicle 100, are connected via a bus (not shown). Forces applied to deployment and positioning vehicle may be determined by sensors (e.g., accelerometers, gyros, tensiometers, etc.) that are part of ADCS system 150 or some other system in order to determine external forces from the grabbed structure that are applied to deployment and positioning vehicle 100 by that structure and other deployment and positioning vehicles. Deployment and positioning vehicle 100 may send this information to other deployment and positioning vehicles, and an agreement may be reached with the other deployment and positioning vehicles regarding the respective force and counterforce that each vehicle should apply. In some embodiments, communications circuitry 120, processing circuitry 130, power system 140, and/or ADCS system 150 may plug into a backplane (not shown) that serves as a collective motherboard for these components. Various other components, such as accelerometers, star trackers, thermometers, radiation detectors, spectrometers, etc., may be included in deployment and positioning vehicle 100 without deviating from the scope of the invention.

In some embodiments, deployment and positioning vehicle 100 senses the forces applied by itself and through the structure alone and uses this information to achieve its respective position. Elastic "stretching" forces may be included in the forces from the structure in some embodiments. Reaction wheels from ADCS system 150 and thrust from thrusters 160 and/or 170 are used to compensate for forces from the structure. Not all thrust will be translated to movement. Some thrust will be consumed by the energy required for unfolding or otherwise deploying the structure.

Deployment and positioning vehicle 100 includes an electric thruster 160 driven by fuel (e.g., xenon, krypton, argon, etc.) from a propellant tank 162 and provides high specific impulse propulsion. A chemical thruster 170 (e.g., a solid or liquid propellant chemical thruster) uses fuel to provide lower specific impulse thrust. In some embodiments, only electric thruster(s) or chemical thrusters are used. In certain embodiments, the electric thrusters may be electrospray thrusters, pulsed plasma thrusters, and/or ion thrusters. While a single electric thruster and chemical thruster are depicted in this embodiment, any desired number of electric thrusters, chemical thrusters, and/or any other desired type of thruster(s) at any desired location(s) may be used without deviating from the scope of the invention. Including more thrusters may increase cost, but also increase the maneuverability and ease of control of deployment and positioning vehicle 100.

In order to enable deployment and positioning vehicle 100 to attach itself to and manipulate a structure, a grasper mechanism 180 is included (in this embodiment, a robotic arm—see, for example, U.S. Pat. No. 10,696,425). However, any suitable grasping or attachment mechanism(s) may be used without deviating from the scope of the invention and depending on the application, such as clamps, an interlocking mechanism (see, for example, U.S. Pat. No. 11,518,552), etc. Grasper mechanism 180 is controlled by processing circuitry 130. Grasper mechanism 180 is configured to grab onto a corresponding location (e.g., a slot, a tether, a rod, etc.) of a structure to be deployed or positioned. As for the solar sail itself, there would need to be something that the deployment space vehicles can grab onto. Such components could be implemented as slots around the periphery of a solar sail or via leads that extend from the periphery of the solar sail, for example.

Vehicles such as deployment and positioning vehicle 100 can deploy and/or position a structure by unfurling the structure, rotating the structure for tension provided by centrifugal force and/or pulling the structure using electric thrusters, for example, to maintain a shape. In certain applications, the deployment and positioning vehicles may act as a high reliability extension and deployment technology with rigidity maintained by an internal structure. This internal structure can still be lighter than existing technology by removing the extension components, as well as requiring less material/stiffness to push the structure open.

In addition to facilitating deployment of larger structures than are currently possible and/or economically practical, some embodiments also increase reliability. Reliability for deployment is often a one-shot capability since a single failure in a hub-and-spoke design, for example, cannot easily be recovered from. Using multiple individual vehicles to deploy and position the structure allows a failed vehicle to be replaced with a spare, or excess thrust capability in the remaining vehicles can be used to adjust for the vehicle failure and deploy the structure.

Some embodiments may be used for in-space construction (e.g., space stations, adding additional modules thereto, building spacecraft on-orbit from smaller modules, etc.). Free flying deployment and positioning vehicles could serve in a particular construction orbit, moving from place-to-place to maneuver components, such as pulling them or passing them back-and-forth in a "pitch and catch" technique. On-board positioning and decision-making capabilities enable this deployment and maneuvering without central control requirements in some embodiments.

Figure 2A:
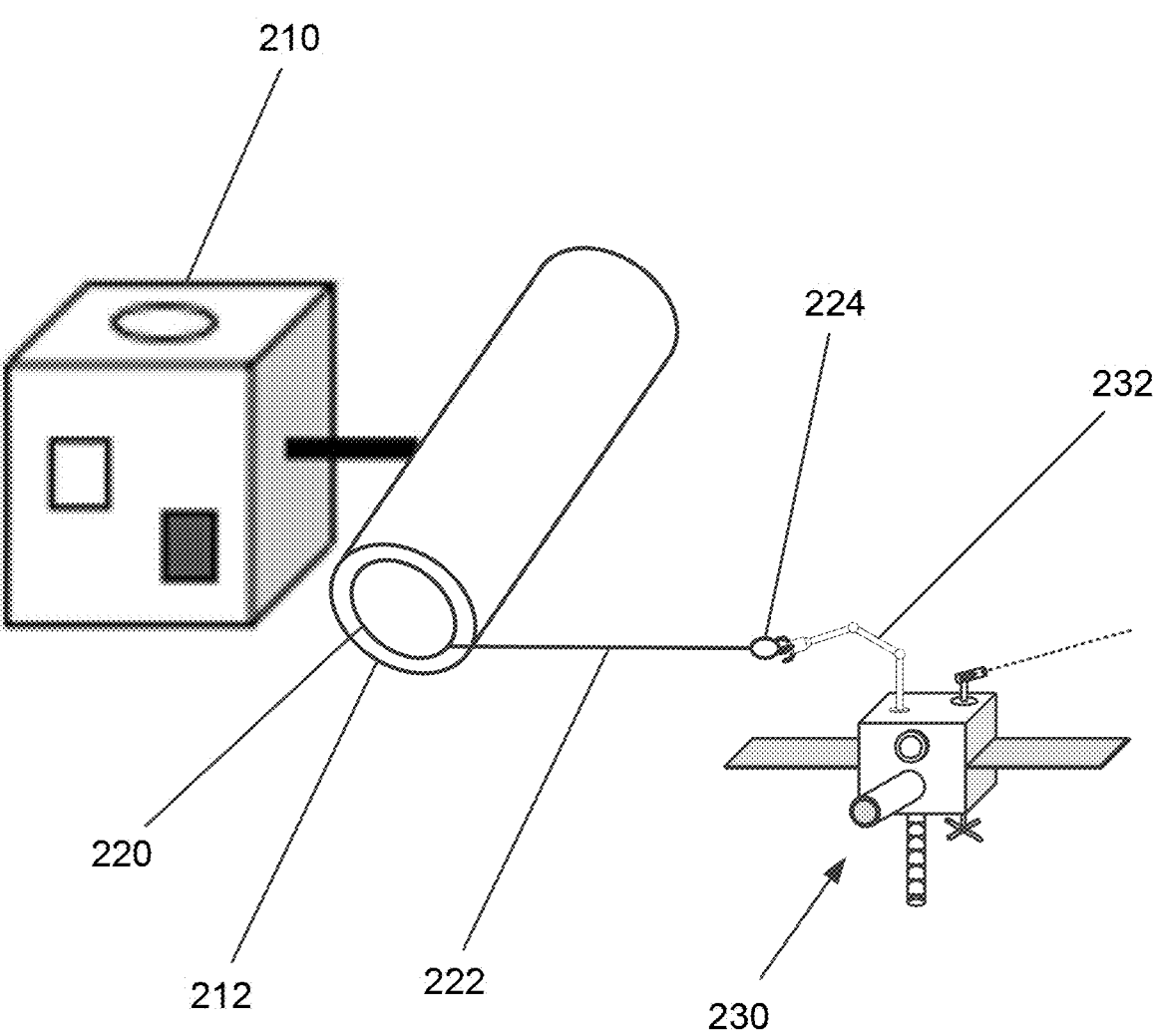
FIG. 2A illustrates an undeployed phase of a solar array deployment scenario, according to an embodiment of the present invention.
Figure 2B:
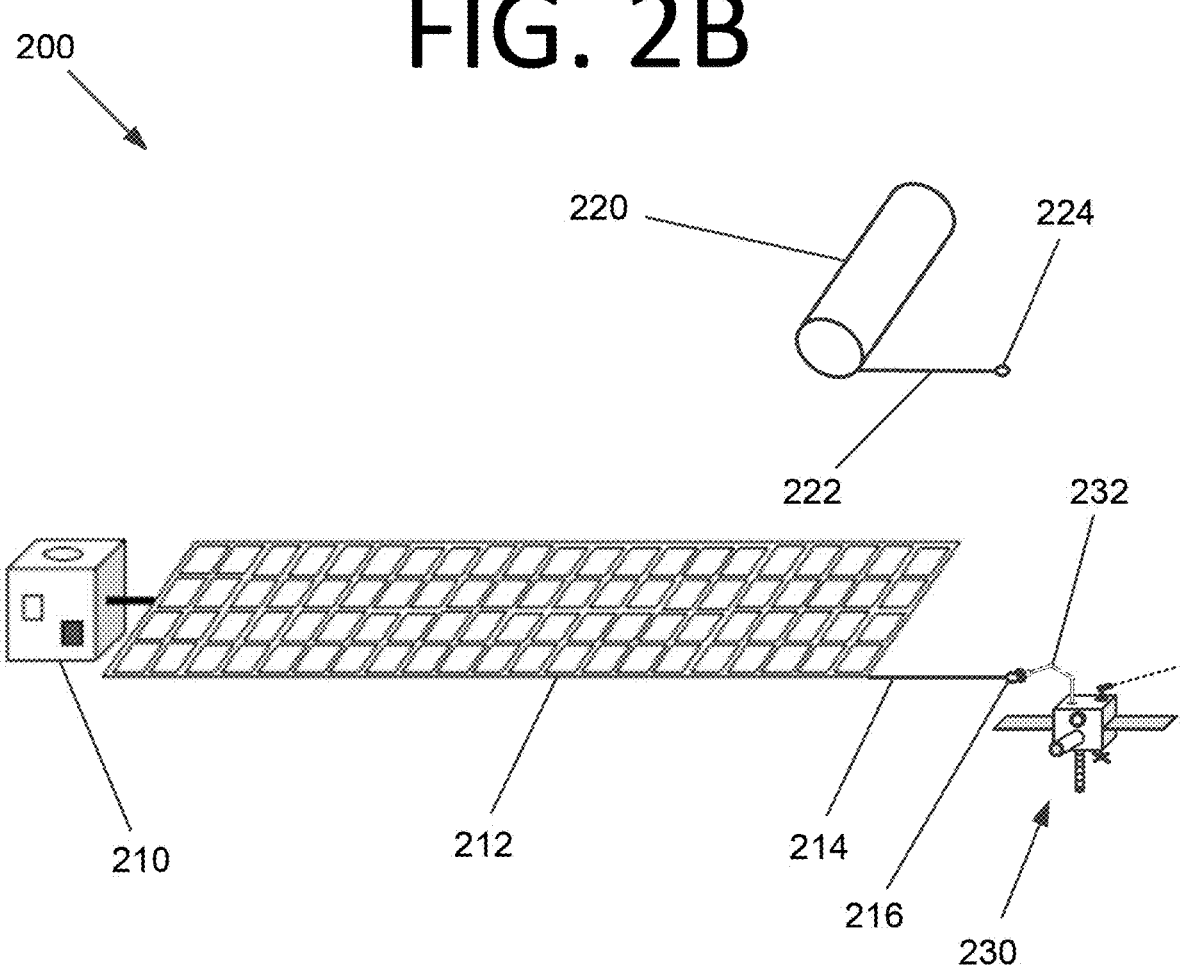
FIG. 2B illustrates a deployed phase of the solar array deployment scenario, according to an embodiment of the present invention.

FIGS. 2A and 2B illustrate an undeployed phase and a deployed phase, respectively, of a solar array deployment scenario 200, according to an embodiment of the present invention. In the first phase, a flexible solar array 212 of main mission vehicle 210 is initially rolled up around a roller 220. A tether 222 with a loop 224 is connected to roller 220. A deployment and positioning vehicle 230 grabs loop 224 via a robotic arm 232 and unrolls flexible solar array 212. In some embodiments, deployment and positioning vehicle 200 may be deployment and positioning vehicle 100 of FIGS. 1A-D.

After flexible solar array 212 is unrolled, roller 220 is freed from flexible solar array 220 and is caused to drift away by deployment and positioning vehicle 230. Deployment and positioning vehicle 230 then grabs a loop 216 of a now accessible tether 214 of flexible solar array 212 that is attached to the distal end of solar array 212 and pulls flexible solar array 212 taut to complete the straightening process. Flexible solar array 212 may have an internal locking mechanism (not shown) in some embodiments that automatically locks flexible solar array 212 in place after flexible solar array 212 is unfurled. In some embodiments, flexible solar array 212 may be held in place through the action of deployment and positioning vehicle 230. Such a process less risk than using motors or springs. Deployment and positioning vehicle 230 can then move on to deploy other structures for main mission vehicle 210 or other vehicles. In some embodiments, tethers 214, 222 and/or loops 216, 224 may include an emitter or an RFID tag to enable deployment and positioning vehicle 200 to more accurately determine the location that it should grab onto.

Figure 3:
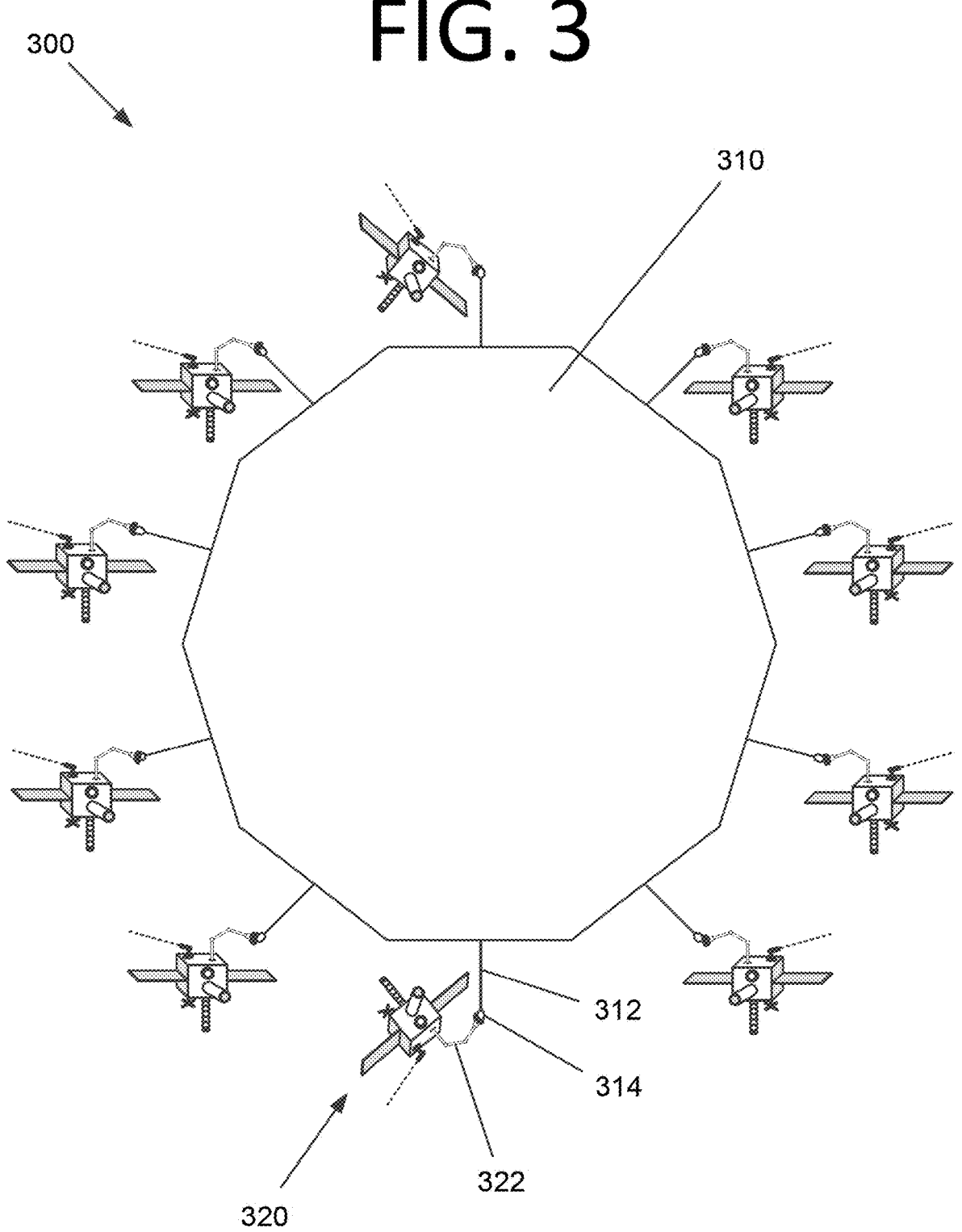
FIG. 3 illustrates a solar sail system, according to an embodiment of the present invention.

FIG. 3 illustrates a solar sail system 300, according to an embodiment of the present invention. While solar sail has a decagon shape in this embodiment, any desired shape may be used without deviating from the scope of the invention (e.g., round, rectangular, elliptical, an n-gon, etc.). Solar sail 310 has tethers 312 with loops 314 attached to the edge of each side. However, any suitable mechanism for deployment and positioning vehicles to grab onto or connect to may be used without deviating from the scope of the invention, such as slots, handles, etc. Deployment and positioning vehicles 320 grab respective loops 314 via respective robotic arms 322 and pull solar sail 310 taut, as well as orient solar sail 310 in the desired position for the mission. The sizes of deployment and positioning vehicles 320 are enlarged for the purpose of this illustration.

Solar sail 310 may be operably connected to a main mission vehicle or payload (not shown). In some embodiments the main mission vehicle or payload may be in the center of the solar sail, pulled behind the solar sail, etc. In certain embodiments, components for the mission can be located on deployment and positioning vehicles 320. For instance, deployment and positioning vehicles 320 may have different components for solar sail system 300 located as desired around the structure. For instance, one or more of deployment and positioning vehicles 320 may have long distance communications equipment, one or more other deployment and positioning vehicles 320 may have cameras, etc.

Figure 4:
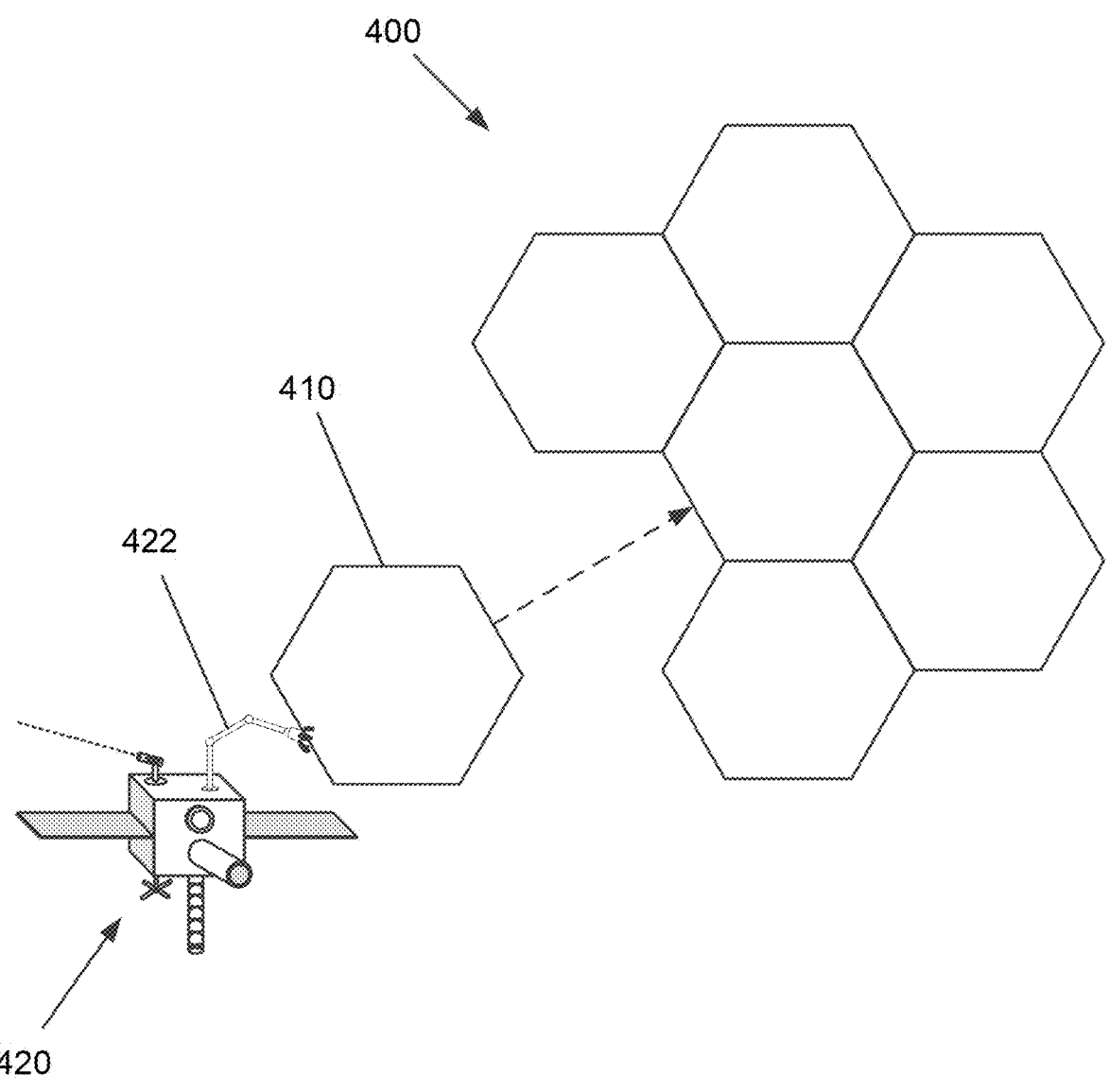
FIG. 4 illustrates assembly of a mirror/reflector, according to an embodiment of the present invention.

FIG. 4 illustrates assembly of a mirror/reflector 400, according to an embodiment of the present invention. Mirror/reflector 400 is constructed from hexagonal reflective tiles 410. One or more deployment and positioning vehicles 420 grab hexagonal reflective tiles 410 (e.g., via robotic arm 422) and place them in position in mirror/reflector 400. Tiles 410 or other units of mirror/reflector 400 may have automatic latching components (not shown) to connect them to neighboring tiles. Alternatively, tiles 410 may employ other systems to engage, such as a remotely activated latch, a latch triggered by deployment and positioning vehicles 420 through mechanical or electromagnetic interaction, etc. After assembly of mirror/reflector 400, deployment and positioning vehicles 420 may perform orientation and/or movement operations upon mirror/reflector 400 to place mirror/reflector 400 in the intended operational mode, such as pointing at its target, placing mirror/reflector 400 in the proper location relative to a telescope or other object, etc.

The mothership vehicle of some embodiments could be any space vehicle architecture with suitable payload space and deployment mechanisms to deploy the smaller solar sail vehicles, as well as potentially receive them back and house them in between deployments. The mothership vehicle of some embodiments could perform refueling for electric propulsion thrusters of the deployment vehicles and receive fuel refills from refueling spacecraft launched from Earth. Such embodiments can provide "deployment depots" where target (main mission) vehicles can have existing structures deployed by deployment and positioning vehicles, and/or even have structures attached/added thereto by deployment and positioning vehicles after the target vehicle is in orbit. The mothership vehicle, or alternatively, a swarm of deployment and positioning vehicles can be placed in a desired orbit that can open up components when the main mission vehicle rendezvous with the mothership vehicle or the swarm. In some embodiments, autonomous movement, commanding, and information sharing between the deployment and positioning vehicles, potentially augmented with artificial intelligence (AI), enables more capable and responsive missions.

Figure 5:
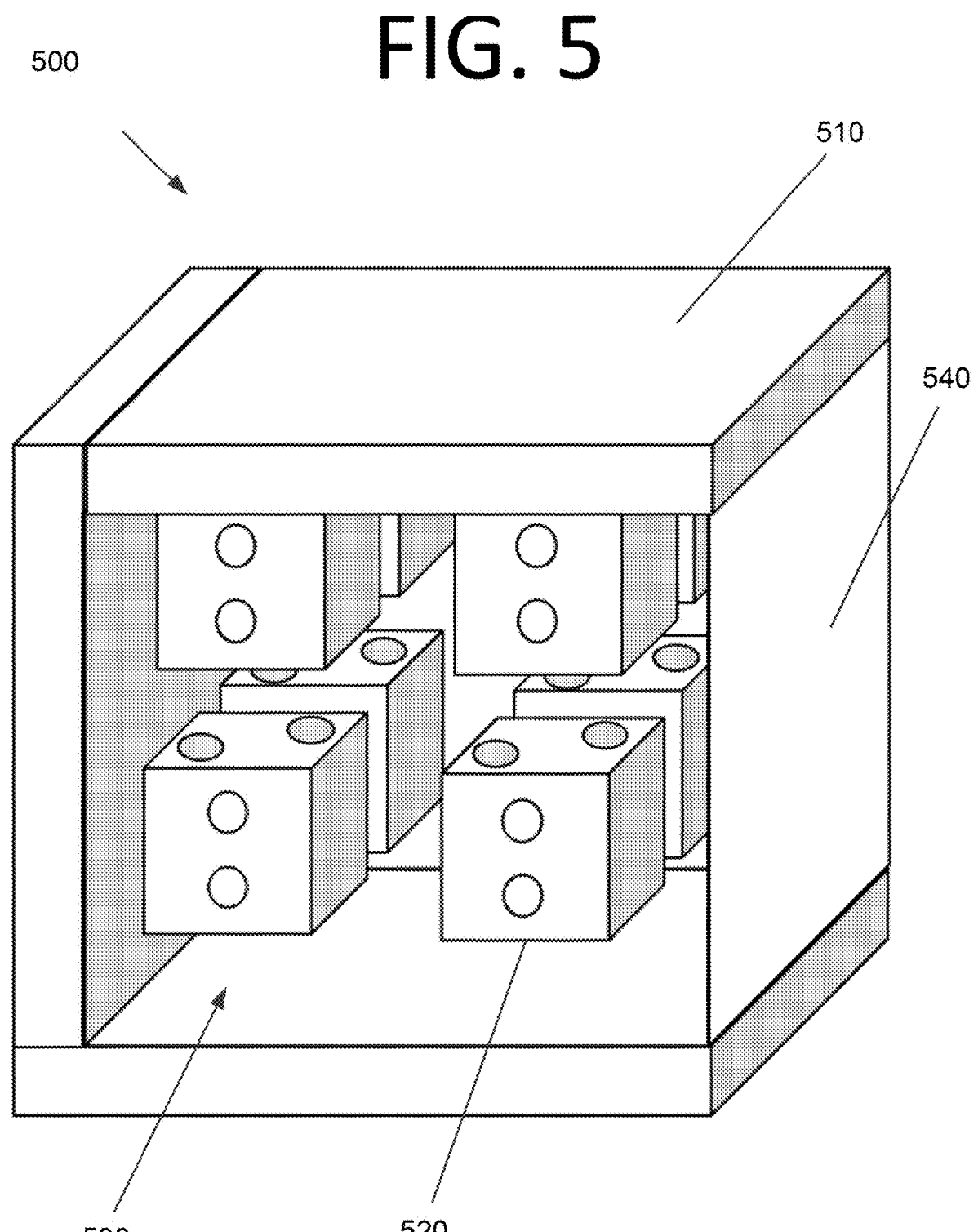
FIG. 5 is a perspective view illustrating a mothership vehicle, according to an embodiment of the present invention.

FIG. 5 is a perspective view illustrating a mothership vehicle 500, according to an embodiment of the present invention. While shown as having a cube shape here, mothership 500 may have any suitable shape capable of housing other space vehicles without deviating from the scope of the invention. In certain embodiments, the "housed" space vehicles may attach externally to mothership 500. The side of mothership vehicle 500 nearest to the viewer has been removed to expose the components therein. Mothership vehicle 500 includes operational systems 510, such as communications circuitry, processing circuitry 130, a power system, a star tracker, a sun sensor, a global positioning system (GPS) sensor, an ADCS, etc. In some embodiments, operational systems 510 may include some or all of the operational systems shown and described with respect to deployment and positioning vehicle 100 of FIGS. 1A-D.

Mothership 500 houses multiple deployment and positioning vehicles 520 in a vehicle bay 530. Deployment and positioning vehicles 520 enter/exit vehicle bay 530 of mothership 500 via a door 540. In some embodiments, mothership 500 may refuel and/or provide electrical power for deployment and positioning vehicles 520. Mothership 500 may control deployment and mission operations of deployment and positioning vehicles 520 in some embodiments.

Figure 6:
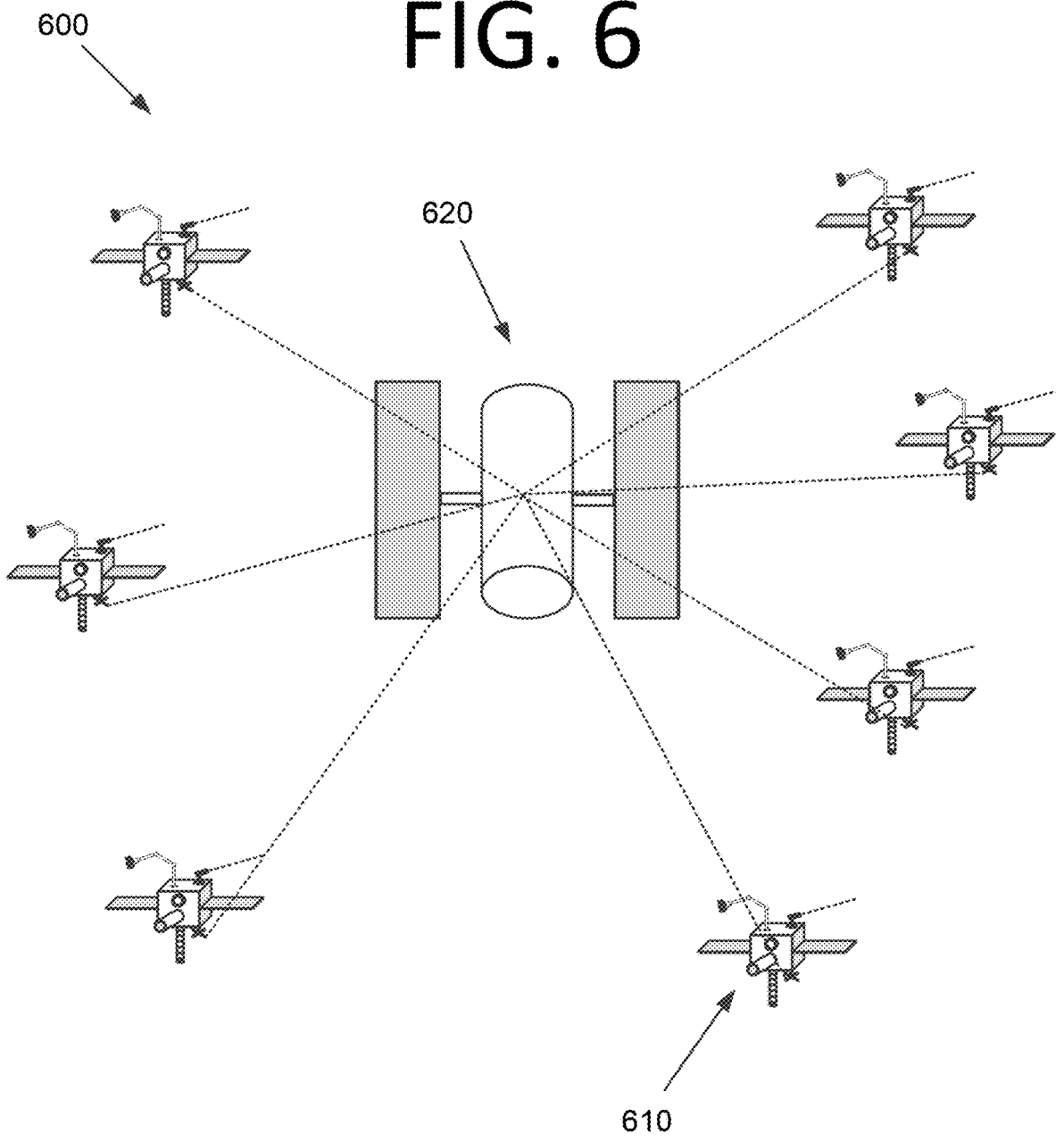
FIG. 6 illustrates a structure deployment and positioning system, according to an embodiment of the present invention.

FIG. 6 illustrates a structure deployment and positioning system 600, according to an embodiment of the present invention. Deployment and positioning system 600 includes a swarm of deployment and positioning vehicles 610 and a mothership vehicle 620. In some embodiments, mothership vehicle 620 may house and/or refuel deployment and positioning vehicles 610. In this embodiment, deployment and positioning vehicles 610 communicate with mothership vehicle 620 via low gain antennae that have a relatively large effective area and less stringent pointing requirements.

In order to precisely maneuver deployment and positioning vehicles 610 into position for deployment of a structure and/or for subsequent positioning of the structure during a mission, deployment and positioning vehicles 610 maintain their relative locations within the swarm using laser range finding, RF or optical beacons, through positioning information delivered from external sources that can track the location of the vehicles, a combination thereof, etc. By using such relative positioning techniques, deployment and positioning vehicles 610 can be in the exact positions that are required for deployment or operational positioning of that structure. For instance, deployment and positioning vehicles 610 could travel to the relative locations on a solar sail and attach themselves thereto.

Mothership vehicle 620, on the other hand, determines actual positions in space, which may be broadcast to deployment and positioning vehicles 610. However, deployment and positioning vehicles 610 may not need to know their exact positions for all missions, and relative positions of the swarm may suffice. Mothership vehicle may communicate with ground stations on Earth, the moon, Mars, etc., use a star tracker, use a sun tracker, communicate with other spacecraft, or any combination thereof, to determine its coordinates using a Cartesian or celestial coordinate system. This allows mothership vehicle 620 and its swarm of deployment and positioning vehicles 610 to deploy to the desired orbit and potentially redeploy to another orbit to meet up with a mission vehicle having a deployable structure. In some embodiments, the mission vehicle may travel to the location of the swarm instead. In certain embodiments, the mothership vehicle may also assist with deployment and/or positioning of the structure if suitable mechanisms to attach to and maneuver the structure are provided thereon.

By using deployment and positioning vehicles 610 that determine their relative positions and using mothership vehicle 620 in a hub-and-spoke type architecture to determine the actual position, potentially in real time or near-real time, the swarm can deploy structures and/or orient the structures as desired for the mission. This enables deployment and positioning vehicles 610 to determine their relative positions via triangulation between itself and other vehicles. Deployment and positioning vehicles 610 could be commanded by mothership vehicle 620 to take their positions in a desired shape, at certain locations on a structure, etc. Deployment and positioning vehicles 610 may also send their relative positions back to mothership vehicle 620. In some embodiments, every vehicle calculates the relative position of every other vehicle from its location. However, in some embodiments, deployment and positioning vehicles 610 are able to determine their own actual positions without assistance from and/or use of mothership vehicle 620.

It may be possible to achieve higher relative positional accuracy in some embodiments by using larger numbers of deployment and positioning vehicles. For instance, a voting system may be used where relative positions for all deployment and positioning vehicles are provided to one another and the position for each vehicle that is agreed upon by the highest number of vehicles is selected. In certain embodiments, the reported positions may be averaged for all vehicles to provide the relative position for each vehicle, and outliers exceeding a tolerance may be omitted from these calculations. In some embodiments, the mothership vehicle may perform these calculations and provide the relative positions that will be used to the deployment and positioning vehicles. Using RF, it is possible to achieve high precision, such as within approximately 5 millimeters (mm) using a 60 gigahertz (GHz) communications frequency. With higher frequencies, even higher precision may be achieved (e.g., sub-millimeter precision with terahertz or optical speeds).

In some embodiments, the relative positioning and/or hub-and-spoke approach for actual position and relative positions may be used for vehicles on the ground, underwater, underground, in a cave, in a building, on an asteroid, etc. The coordinate system that is used may be entirely relative to the vehicles themselves if the actual position in the universe is not needed.

Figure 7:
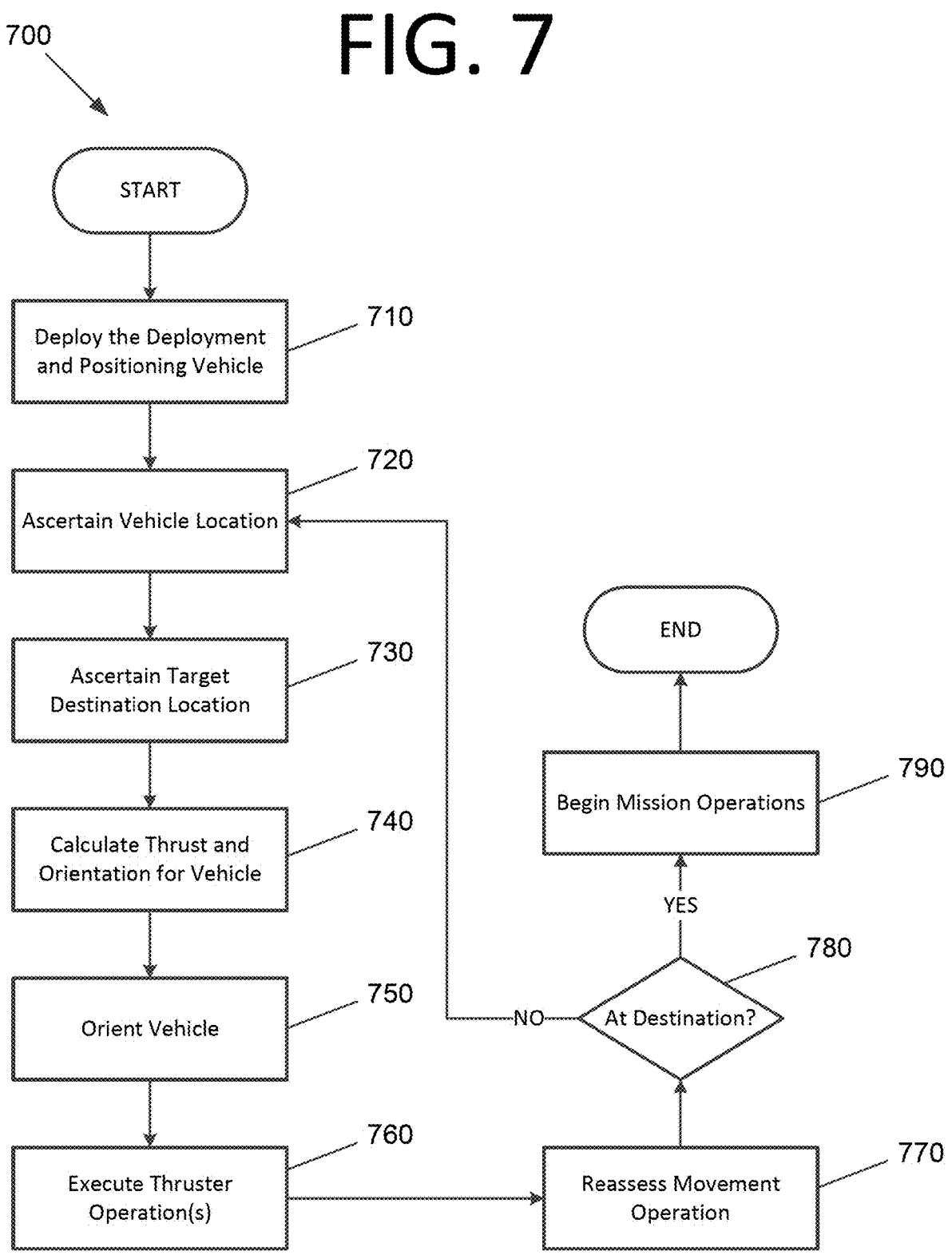
FIG. 7 is a flowchart illustrating a process for navigating to a structure to be deployed, according to an embodiment of the present invention.

FIG. 7 is a flowchart illustrating a process 700 for navigating to a structure to be deployed, according to an embodiment of the present invention. The process begins with deploying the deployment and positioning vehicle at 710. In some embodiments, the deployment and positioning vehicle is deployed from a faring of a launch vehicle (e.g., a rocket). In certain embodiments, the deployment and positioning vehicle is deployed from a mothership. In some embodiments, the deployment and positioning vehicle is deployed from an orbit or a location in space, where multiple deployment and positioning vehicles are awaiting instructions to assist with the deployment and/or mission of a structure.

The deployment and positioning vehicle ascertains its location at 720. This may be done by using a star tracker, a sun sensor, location information from a mothership, relative location information from the deployment and positioning vehicle to other vehicles, etc. The target destination location is also ascertained by the deployment and positioning vehicle at 730 relative to its own position at 730 (e.g., as a vector, coordinates in a common coordinate system that includes locations of the deployment and positioning vehicle and the target, etc.). In some embodiments, the deployment and positioning vehicle may take into account its velocity and direction of travel, as well as that of the target.

Based on the location of the deployment and positioning vehicle and the target (and potentially the velocities and directions of travel of each), the deployment and positioning vehicle calculates the thrust and the orientation that the deployment and positioning vehicle will use to attempt to reach the target at 740. The deployment and positioning vehicle then orients itself accordingly at 750 and executes thruster operation(s) at 760. The deployment and positioning vehicle then reassesses its movement operation at 770 after some period of time has passed, a certain distance has been traveled, etc.

If the deployment and positioning vehicle has reached the destination at 780 (e.g., a desired location on the target), the deployment and positioning vehicle begins its mission operations at 790, potentially in concert with other deployment and positioning vehicles. For instance, the deployment and positioning vehicle may unfurl and/or orient a solar sail, deploy a solar panel, deploy an antenna, deploy an instrument boom, etc. However, if the deployment and positioning vehicle has not reached the desired destination at 780, the deployment and positioning vehicle returns to step 720 and attempts to travel to the target location accordingly.

Figure 8:
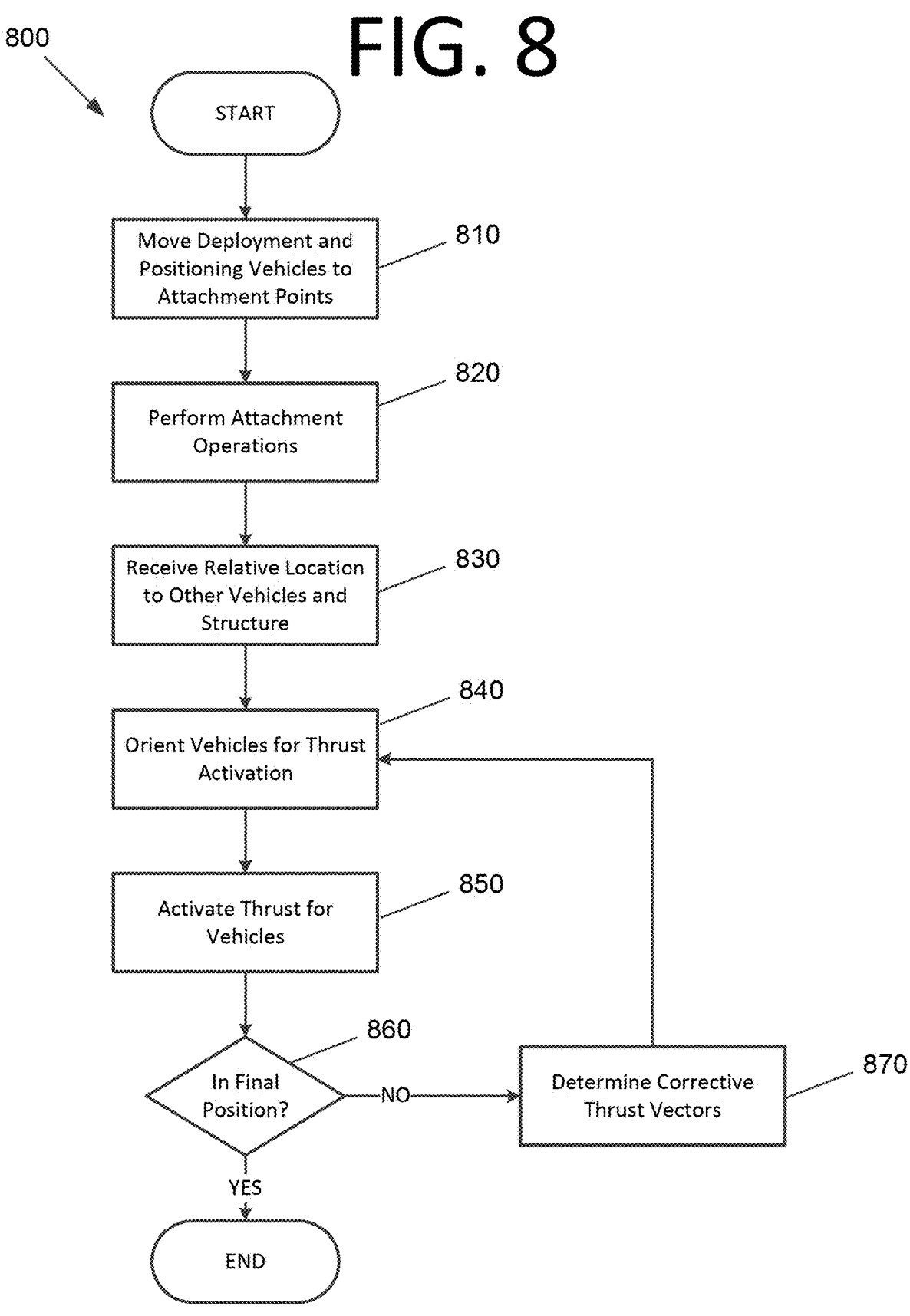
FIG. 8 is a flowchart illustrating a process for deploying and managing/positioning a structure, according to an embodiment of the present invention.

FIG. 8 is a flowchart illustrating a process 800 for deploying and managing/positioning a structure, according to an embodiment of the present invention. The process begins with moving the deployment and positioning vehicles to their attachment points at 810. In some embodiments, this may include or be process 700 of FIG. 7. The deployment and positioning vehicles then perform their respective attachment operations at 820.

Each deployment and positioning vehicle receives the relative location of itself with respect to the other deployment and positioning vehicles and the structure at 830. In some embodiments, this relative position information may be supplemented by actual position information from a mothership, for example. The deployment and positioning vehicles then orient themselves at 840 and activate thrust at 850 in order to begin orienting the structure into the desired position, orientation, and/or configuration.

If the structure and the deployment and positioning vehicles are in the final position at 860, the process ends. However, if not, the deployment and positioning vehicles determine corrective thrust vectors at 870. The process then returns to step 840 to repeat the orientation and thrust activation for the deployment and positioning vehicles based on the determined corrective thrust vectors.

Figure 9:
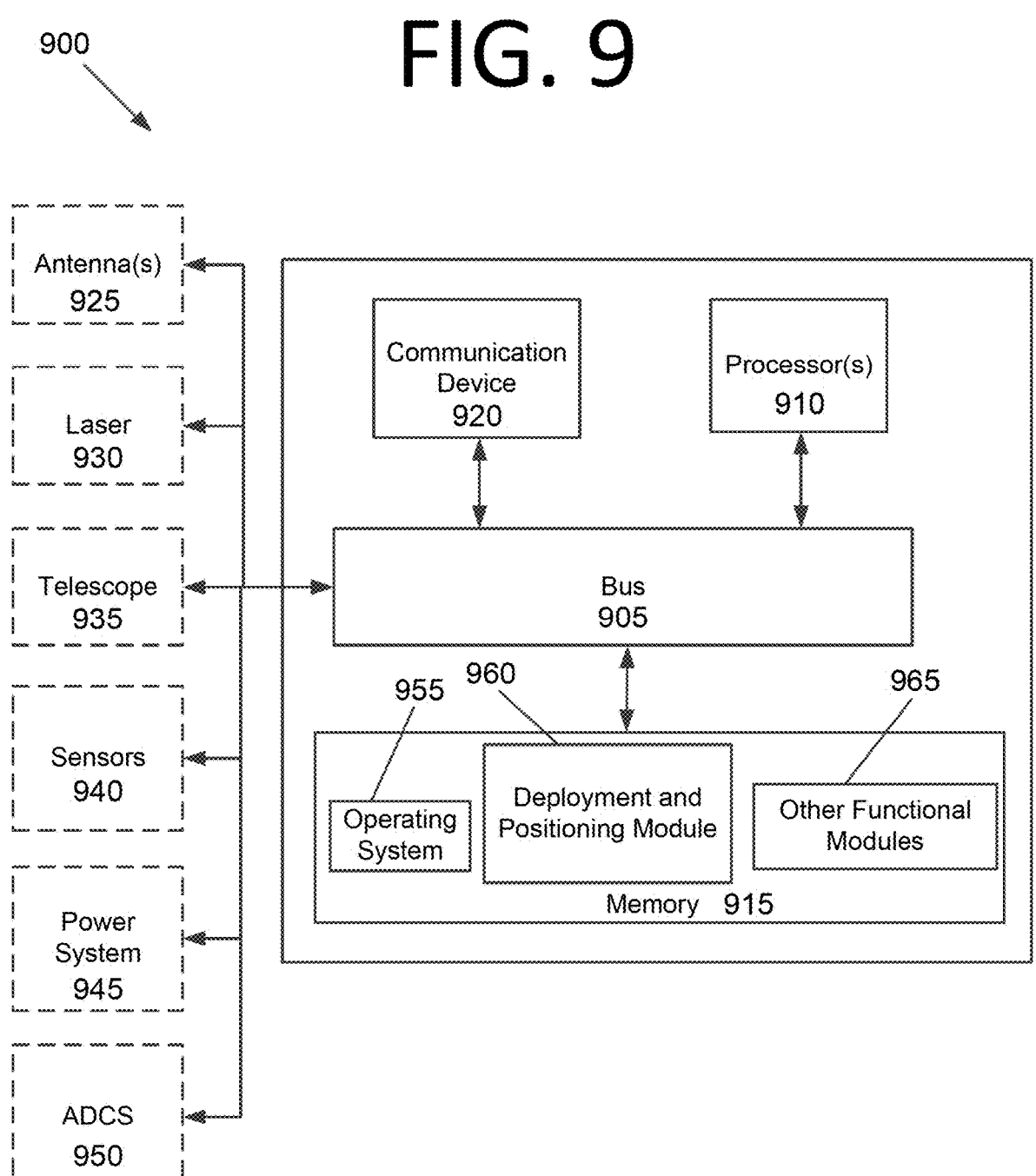
FIG. 9 is an architectural diagram illustrating a computing system configured to deploy and/or position a structure, according to an embodiment of the present invention.

FIG. 9 is an architectural diagram illustrating a computing system 900 configured to deploy and/or position a structure, according to an embodiment of the present invention. In some embodiments, computing system 900 may be one or more of the computing systems depicted and/or described herein, such as control electronics for a deployment and positioning vehicle or a mothership vehicle. In some embodiments, computing system 900 may be or may be a part of communications circuitry and/or processing circuitry, such as communications circuitry 120 and/or processing circuitry 130 of FIG. 1.

Computing system 900 includes a bus 905 or other communication mechanism for communicating information, and processor(s) 910 coupled to bus 905 for processing information. Processor(s) 910 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 910 may also have multiple processing cores, and at least some of the cores may be configured to perform specific functions. Multi-parallel processing may be used in some embodiments. In certain embodiments, at least one of processor(s) 910 may be a neuromorphic circuit that includes processing elements that mimic biological neurons. In some embodiments, neuromorphic circuits may not require the typical components of a Von Neumann computing architecture.

Computing system 900 further includes memory 915 for storing information and instructions to be executed by processor(s) 910. Memory 915 can be comprised of any combination of random access memory (RAM), read-only memory (ROM), flash memory, cache, static storage such as a magnetic or optical disk, or any other types of non-transitory computer-readable media or combinations thereof. Non-transitory computer-readable media may be any available media that can be accessed by processor(s) 910 and may include volatile media, non-volatile media, or both. The media may also be removable, non-removable, or both.

Additionally, computing system 900 includes a communication device 920, such as a transceiver, to provide access to a communications network via a wireless and/or wired connection. In some embodiments, communication device 920 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 920 may include one or more antennas that are singular, arrayed, phased, switched, beamforming, beamsteering, a combination thereof, and or any other antenna configuration without deviating from the scope of the invention.

Processor(s) 910 are further coupled via bus 905 to antenna(s) 925, laser 930, telescope 935, sensors 940 (e.g., accelerometers, gyros, tensiometers, etc.), power system 945, and/or ADCS 950. Which of these components is included may depend on whether computing system 900 is part of a deployment and positioning vehicle, a mothership, etc. Memory 915 stores software modules that provide functionality when executed by processor(s) 910. The modules include an operating system 955 for computing system 900. The modules further include a deployment and positioning module 960 that is configured to perform all or part of the processes described herein or derivatives thereof. Computing system 900 may include one or more additional functional modules 965 that include additional functionality.

One skilled in the art will appreciate that a "computing system" could be embodied as an embedded computing system, a flight computer, a microcontroller, an FPGA, or any other suitable computing device, or combination of devices without deviating from the scope of the invention. Presenting the above-described functions as being performed by a "computing system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN) for space vehicles, a mesh network, a satellite communications network, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as FPGAs, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 7 and 8 may be performed by computer program(s), encoding instructions for the processor(s) to perform at least part of the process(es) described in FIGS. 7 and 8, in accordance with embodiments of the present invention. The computer program(s) may be embodied on non-transitory computer-readable media. The computer-readable media may be, but are not limited to, a hard disk drive, a flash device, RAM, a tape, and/or any other such medium or combination of media used to store data. The computer program(s) may include encoded instructions for controlling processor(s) of computing system(s) (e.g., processor(s) 910 of computing system 900 of FIG. 9) to implement all or part of the process steps described in FIGS. 7 and 8, which may also be stored on the computer-readable medium.

The computer program(s) can be implemented in hardware, software, or a hybrid implementation. The computer program(s) can be composed of modules that are in operative communication with one another, and which are designed to pass information or instructions to display. The computer program(s) can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A space structure deployment and/or positioning system, comprising:
at least two deployment and positioning vehicles in a deployment and positioning vehicle network, each comprising:
one or more thrusters configured to propel the respective deployment and positioning vehicle,
an attitude determination and control system (ADCS) configured to rotate and orient the respective deployment and positioning vehicle,
a grasping or attachment mechanism configured to operably connect the respective deployment and positioning vehicle to a space structure,
a precision vehicle-to-vehicle location determination system configured to determine a relative location of another deployment and positioning vehicle of the at least two deployment and positioning vehicles in real time or near-real time and
processing circuitry configured to control the one or more thrusters, the ADCS, and the grasping or attachment mechanism, wherein
the processing circuitry is configured to control the grasping or attachment mechanism to grab onto or attach to a corresponding location of the space structure, and
the at least two deployment and positioning vehicles are configured to coordinate the deployment and positioning of a space structure by communicating and coordinating operations directly with one another and updating their relative positions and interactions with the space structure during deployment.

2. The space structure deployment and positioning system of claim 1, wherein the corresponding location of the space structure is a slot, a tether, or a rod.

3. The space structure deployment and positioning system of claim 1, wherein the grasping or attachment mechanism is a robotic arm, one or more clamps, or an interlocking or connection mechanism.

4. The space structure deployment and positioning system of claim 1, wherein the precision vehicle-to-vehicle location determination system comprises:
a high gain antenna, a low gain antenna, or both; and
radio frequency (RF) circuitry for the high gain antenna, the low gain antenna, or both.

5. The space structure deployment and positioning system of claim 1, wherein the precision vehicle-to-vehicle location determination system comprises:
a laser and a telescope; and
optical processing circuitry configured to control the laser and process optical signals received by the telescope, wherein
the optical processing circuitry is configured to allow a respective deployment and positioning vehicle to accurately determine its position with respect to the one or more other deployment and positioning vehicles in the deployment and positioning vehicle network and the space structure to determine where to grab or otherwise attach to the space structure.

6. The space structure deployment and positioning system of claim 1, wherein the at least two deployment and positioning vehicles are configured to be deployed from a payload attached to the space structure, a mothership, or a fairing of a launch vehicle.

7. The space structure deployment and positioning system of claim 1, wherein the at least two deployment and positioning vehicles are configured to deploy the space structure by pulling and rotating the space structure.

8. The space structure deployment and positioning system of claim 1, wherein the at least two deployment and positioning vehicles, when deployed in orbit and operably connected to the space structure, are configured to oppose a gravitational gradient across the space structure and account for a solar flux by applying respective forces using one or more respective thrusters that provide a local gravitational correction relative to respective locations of the two or more deployment and positioning vehicles on the space structure.

9. The space structure deployment and positioning system of claim 1, wherein the at least two deployment and positioning vehicles, when deployed in orbit and operably connected to the space structure, are configured to accelerate rotation of the space structure or slow rotation of the space structure by applying respective forces using one or more respective thrusters that provide a local gravitational correction relative to respective locations of the two or more deployment and positioning vehicles on the space structure.

10. The space structure deployment and positioning system of claim 1, wherein at least one deployment and positioning vehicle in the deployment and positioning vehicle network has a different architecture than at least one other deployment and positioning vehicle in the deployment and positioning vehicle network.

11. The space structure deployment and positioning system of claim 1, wherein the at least two deployment and positioning vehicles, via the processing circuitry, are configured to perform in-space construction.

12. The space structure deployment and positioning system of claim 1, wherein the deployment and positioning vehicle network comprises at least one other deployment and positioning vehicle in addition to the at least two deployment and positioning vehicles, and the at least two deployment and positioning vehicles, via the processing circuitry, are configured to position themselves in an orbit or location in space with the at least one other deployment and positioning vehicle in the deployment and positioning vehicle network, leave the orbit or location to deploy and position the space structure, and return to the orbit or location after the deployment and positioning of the space structure is completed.

13. The space structure deployment and positioning system of claim 1, further comprising:

a mothership configured to manage space-to-ground links for command and control and ranging of the space structure deployment and for positioning of the at least two deployment and positioning vehicles in the deployment and positioning vehicle network.

14. The space structure deployment and positioning system of claim 13, wherein the mothership comprises a vehicle bay configured to house the at least two deployment and positioning vehicles.

15. The space structure deployment and positioning system of claim 13, wherein the mothership comprises a star tracker, a sun sensor, a global positioning system (GPS), an antenna, or any combination thereof, and the mothership is configured to determine an actual position of the mothership in space.

16. The space structure deployment and positioning system of claim 15, wherein the at least two deployment and positioning vehicles are configured to determine their relative positions to the mothership and the space structure.

17. Two or more deployment and positioning vehicles, each comprising:

one or more thrusters configured to propel the respective deployment and positioning vehicle;

an attitude determination and control system (ADCS) configured to rotate and orient the respective deployment and positioning vehicle;

a grasping or attachment mechanism configured to operably connect the respective deployment and positioning vehicle to a space structure;

a precision vehicle-to-vehicle location determination system configured to determine a relative location of another deployment and positioning vehicle of the two or more deployment and positioning vehicles; and processing circuitry configured to control the one or more thrusters, the ADCS, and the grasping or attachment mechanism, wherein the processing circuitry is configured to control the grasping or attachment mechanism to grab onto or attach to a corresponding location of the space structure, and the two or more deployment and positioning vehicles are part of a deployment and positioning vehicle network and configured to coordinate deployment of a space structure and positioning of at least one of the space structure or other deployment and positioning vehicles responsive to the deployment and positioning vehicle network by communicating and coordinating operations directly with one another and updating their relative positions and interactions with the space structure and the other deployment and positioning vehicles during deployment.

18. The two or more deployment and positioning vehicles of claim 17, wherein the precision vehicle-to-vehicle location determination system comprises:

a high gain antenna, a low gain antenna, or both; and radio frequency (RF) circuitry for the high gain antenna, the low gain antenna, or both.

19. The two or more deployment and positioning vehicles of claim 17, wherein the precision vehicle-to-vehicle location determination system comprises:

a laser and a telescope; and optical processing circuitry configured to control the laser and process optical signals received by the telescope, wherein the optical processing circuitry is configured to allow the respective deployment and positioning vehicle to accurately determine its position with respect to another deployment and positioning vehicle of the at least two deployment and positioning vehicles and/or the structure to determine where to grab or otherwise attach to the space structure.

20. The two or more deployment and positioning vehicles of claim 17, wherein the two or more deployment and positioning vehicles are configured to be deployed from a payload attached to the space structure, a mothership, or a fairing of a launch vehicle.

21. The two or more deployment and positioning vehicles of claim 17, wherein the two or more deployment and positioning vehicles are configured to deploy the space structure by pulling and rotating the space structure.

22. The two or more deployment and positioning vehicles of claim 17, wherein the two or more deployment and positioning vehicles, when deployed in orbit and operably connected to the space structure, are configured to oppose a gravitational gradient across the space structure and/or account for a solar flux by applying respective forces using one or more respective thrusters that provide a local gravitational correction relative to respective locations of the two or more deployment and positioning vehicles on the space structure.

23. The two or more deployment and positioning vehicles of claim 17, wherein the two or more deployment and positioning vehicles, when deployed in orbit and operably connected to the space structure, are configured to accelerate rotation of the space structure or slow rotation of the space structure by applying respective forces using one or more respective thrusters that provide a local gravitational correction relative to respective locations of the two or more deployment and positioning vehicles.

24. The two or more deployment and positioning vehicles of claim 17, wherein the two or more deployment and positioning vehicles, via the processing circuitry, are configured to perform in-space construction.

25. The two or more deployment and positioning vehicles of claim 17, wherein the deployment and positioning vehicle network comprises at least one other deployment and positioning vehicle in addition to the two or more deployment and positioning vehicles, and the two or more deployment and positioning vehicles, via the processing circuitry, are configured to position themselves in an orbit or location in space with the at least one other deployment and positioning vehicle in the deployment and positioning vehicle network, leave the orbit or location to deploy and/or position the space structure, and return to the orbit or location after the deployment and/or positioning of the space structure is completed.

26. The two or more deployment and positioning vehicles of claim 17, wherein the two or more deployment and positioning vehicles are configured to determine their relative positions to a mothership and the space structure.

* * * * *